United States Patent [19]
Suzuka et al.

[11] Patent Number: 5,519,690
[45] Date of Patent: May 21, 1996

[54] COMMUNICATION CONTROL APPARATUS HAVING FUNCTION FOR LIMITING FRAME RECEPTION AND SWITCHING SYSTEM WITH THE SAME

[75] Inventors: Tetsuya Suzuka, Chigasaki; Masao Kunimoto, Fujisawa; Shinichi Iwaki, Kamakura; Satoshi Shimizu, Yokohama, all of Japan

[73] Assignee: Hitachi, Ltd., Tokyo, Japan

[21] Appl. No.: 336,202

[22] Filed: Nov. 4, 1994

[30] Foreign Application Priority Data

Nov. 8, 1993 [JP] Japan .................................. 5-278063

[51] Int. Cl.$^6$ .................................................. H04L 12/56
[52] U.S. Cl. .............................. 370/17; 370/58.2; 370/60; 370/79; 370/94.1
[58] Field of Search .............................. 370/17, 58.2, 60, 370/60.1, 79, 94.1, 94.2

[56] References Cited

U.S. PATENT DOCUMENTS

| | | | |
|---|---|---|---|
| 5,237,564 | 8/1993 | Lespagnol et al. | 370/60.1 |
| 5,371,731 | 12/1994 | Pratt et al. | 370/79 X |
| 5,373,504 | 12/1994 | Tanaka et al. | 370/60.1 |
| 5,390,299 | 2/1995 | Rege et al. | 370/60 X |

OTHER PUBLICATIONS

Timer Processing Method for High–Multiplexing Communication Control LSI, Institute of Electronics, Information and Communication Engineers Spring Convention B–469, by T. Suzuka et al.

Primary Examiner—Douglas W. Olms
Assistant Examiner—Russell W. Blum
Attorney, Agent, or Firm—Antonelli, Terry, Stout & Kraus

[57] ABSTRACT

A communication control apparatus connected between a transmission path and a processing unit which apparatus includes a table memory for storing the number of received frames which are in the state waiting for protocol processing in correspondence with connection identifiers, a first processor responsive to reception of a new frame from the aforementioned transmission path for making decision by referencing the memory table mentioned above as to whether or not the number of the received frames corresponding to the connection identifier of the newly received frame and waiting for the protocol processing has reached a threshold value for thereby abandoning the aforementioned newly received frame when that number has reached the threshold value and, if otherwise, placing the newly received frame in the state waiting for the protocol processing, and a second processor for executing a predetermined protocol processing on the received frame in the state waiting for the protocol processing.

10 Claims, 8 Drawing Sheets

EVENT MANAGING
INFORMATION
170

| SUBSCRIBER (USER) | CONNECTION ID NUMBER | NUMBER OF WAITING EVENTS | |
|---|---|---|---|
| | | COUNTER | UPPER LIMIT VALUE |
| USER 1 | C-0 | | |
| | C-1 | C1 | n1 |
| | C-2 | | |
| USER 2 | C-3 | C2 | n2 |
| | C-4 | | |
| | | | |

COMMUNICATION CONTROL APPARATUS HAVING FUNCTION FOR LIMITING FRAME RECEPTION AND SWITCHING SYSTEM WITH THE SAME

BACKGROUND OF THE INVENTION (1) Field of the Invention

The present invention relates to a communication control method, a communication control apparatus and a switching system, and more particularly, the invention is concerned with a frame reception control function in a high-multiplexing communication control apparatus and the switching system, by way of example.

(2) Description of the Related Art

As is reported, for example, in "Timer Processing Method For High-Multiplexing Communication Control LSI" in IEICE (the Institute of Electronics, Information and Communication Engineers) SPRING CONVENTION B-469, a communication control apparatus for performing frame communication in accordance with communication protocols such as HDLC, etc. has been highly multiplexed in recent years such that the number of connections capable of being processed amounts to several thousands. As one of the technical problems to be dealt with in such a high-multiplexing communication control apparatus, there may be mentioned a problem which concerns scheduling of objects subjected to processing.

Heretofore, in a high-multiplexing communication control apparatus, it is known that with a view to making it possible to process the frames received via a plurality of connections, processing driving or activating events are issued in correspondence with the received frames stored in a receiving buffer and registered sequentially in a queue (hereinafter referred to as the event queue) so that the processing unit can take out from the event queue the events sequentially, starting from the leading one, to thereby read out a received frame corresponding to the event from the receiving buffer for processing the received frame.

In this conjunction, it is noted that in the case of a high-multiplexing communication control apparatus designed for processing received frames by making use of the event queue, the event issued upon every reception of the frame is unconditionally registered in the event queue. As a consequence, when a large number of frames are sent out concentratively during a given period by a particular user or terminal equipment, the memory capacity of the event queue is unduly consumed by the plural events issued by that particular user, incurring an unwanted situation that the events for the other users are abandoned because of a shortage in the memory capacity of the event queue. In that case, a system resource such as the function of the processor connected to the communication control apparatus and the like will exclusively be allocated to the processing of the received frames from the particular user, whereby a restriction or limitation is imposed on the service for the other users, giving rise to a problem.

By way of example, the signalling unit of a switching system which is one species of the communication control apparatuses receives a signal frame for controlling a call from a calling party terminal in precedence to setting up a data connection between the terminals. In that case, when a particular terminal issues at a high frequency a control signal for call set-up/disconnection because of occurrence of failure in the terminal or erroneous manipulation thereof by the user, an excessively large number of signal frames will concentratively arrive at the signal processing unit from the particular terminal equipment, which will result in the call control processor unit repeating the set-up/disconnection for the particular connection in vain, involving a problem that the processing for the connections for the other users is thereby delayed.

SUMMARY OF THE INVENTION

It is therefore an object of the present invention to provide a communication control method which is capable of performing reception processing operations while abandoning selectively some of the received frames having respective connection identifiers and a communication apparatus to which the communication control method is applied.

Another object of the present invention is to provide a communication control method which is capable of distributing resources of the communication control apparatus and the processing unit connected thereto appropriately to the connections to be handled by the aforementioned communication control apparatus.

Yet another object of the present invention is to provide a communication control method which is capable of limiting the reception processing for the frames transmitted concentratively from a particular user or terminal equipment.

A further object of the present invention is to provide a switching system capable of refusing the processing for those of the frames which are sent out in the form of packets or cells from a terminal and which are received under specific conditions.

In view of the above objects, a communication control method according to the present invention has the feature that a number of received frames which are waiting for protocol processing in the communication control apparatus are managed in correspondence with respective connection identifiers, and in response to reception of a new frame from the transmission path, a decision is made as to whether or not the number of the received frames having a connection identifier corresponding to that of the received frame and waiting for protocol processing has attained a predetermined threshold value, and that the newly received frame is abandoned if the number of the received frames waiting for the protocol processing has reached the threshold value.

The threshold value and the number of the received frames waiting for the protocol processing which are referenced upon decision as to abandonment of the received frames may be managed for each of groups to which a plurality of connection identifiers are previously classified such that upon reception of a new frame, it is abandoned when the number of the received frames waiting for the protocol processing and corresponding to the group to which the connection identifier of the received frame belongs attains a preset threshold value.

The classification into the groups mentioned above may be realized, for example, in such a manner that a plurality of connections set up by a plurality of terminals belonging to one and the same user (subscriber) are classified into one group so that the frame reception can be limited on a user-by-user basis.

The communication control method described above may be applied to a communication system in which each of the frames is transmitted in the form divided into a plurality of packets or cells (fixed-length packets) and in which the communication control apparatus is so arranged as to assemble a received frame from a plurality of packets received via the transmission path.

In a mode for practically carrying out the present invention, the communication control apparatus makes a decision as to the abandonment of the frame mentioned above after having stored the newly received frame in a received frame buffer memory and unless the number of the received frames waiting for the protocol processing attains the threshold value, a reception event containing the information specifying the newly received frame is registered in an event queue, wherein after execution of the predetermined protocol processings on the received frames corresponding to the received events taken out sequentially from the event queue mentioned above, the information in the newly received frame is transferred to a data processing unit connected to the communication control apparatus.

A communication control apparatus according to the present invention may include a memory means for storing the number of received frames which are in the state of waiting for protocol processing in correspondence with respective connection identifiers, a first means responsive to reception of a new frame from a transmission path for referencing the memory means to determine whether or not the number of the received frames corresponding to the connection identifier of the newly received frame and waiting for the protocol processing has reached a threshold value and for abandoning the newly received frame when that number has reached the threshold value and, if otherwise, placing the newly received frame in the state waiting for the protocol processing, and a second means for executing a predetermined protocol processing on the received frame in the state waiting for the protocol processing.

In a preferred mode for carrying out the present invention, the memory means may be so arranged as to store the threshold values indicating permissible numbers of the protocol processing waiting frames in correspondence with the connection identifiers, respectively, wherein upon reception of a new frame via the transmission path, the aforementioned first means reads out from the memory means the number of the received frames waiting for protocol processing and the threshold value corresponding to the connection identifier of the newly received frame, to thereby decide whether the newly received frame is to be abandoned or not.

Further, there is provided according to the present invention a switching system which includes a switch having a plurality of input ports and a plurality of output ports for outputting packets received from each of the input ports selectively to one of the output ports which is determined in accordance with header information of the packets, a signalling unit connected to the switch for performing a predetermined protocol processing, and a control unit connected to the signal processing unit, wherein the signalling unit includes a memory means for storing the number of received frames which are in the state waiting for protocol processing in correspondence with connection identifiers, a first means responsive to reception of a new control signal frame from the aforementioned switch for referencing the memory means to determine whether or not the number of the received frames corresponding to the connection identifier of the newly received frame and waiting for protocol processing has reached the threshold value for thereby abandoning the newly received frame when the number has reached the threshold value and, if otherwise, placing the newly received frame in state waiting for the protocol processing, and a second means for executing predetermined protocol processings on the received frames waiting for protocol processing. The first and second means mentioned above may be constituted by separate processors, respectively.

According to the teaching of the present invention, the number of the received frames which are in the state for awaiting protocol processing in the communication control apparatus can be managed in correspondence to connections or connection groups, respectively, in such manner that the new frame received via the connection for which the number of the frames awaiting frames has reached the threshold value is abandoned without performing the protocol processing. Thus, exclusive occupation of the resources or service functions of the communication control apparatus and the processing unit connected thereto by a particular user can positively be avoided.

The foregoing and other objects, advantages, manner of operation and novel features of the present invention will be understood from the following detailed description when read in conjunction with the accompanying drawings.

DESCRIPTION OF THE PREFERRED EMBODIMENTS

Now, the present invention will be described in conjunction with preferred or exemplary embodiments thereof by reference to the drawings.

Figure 1:
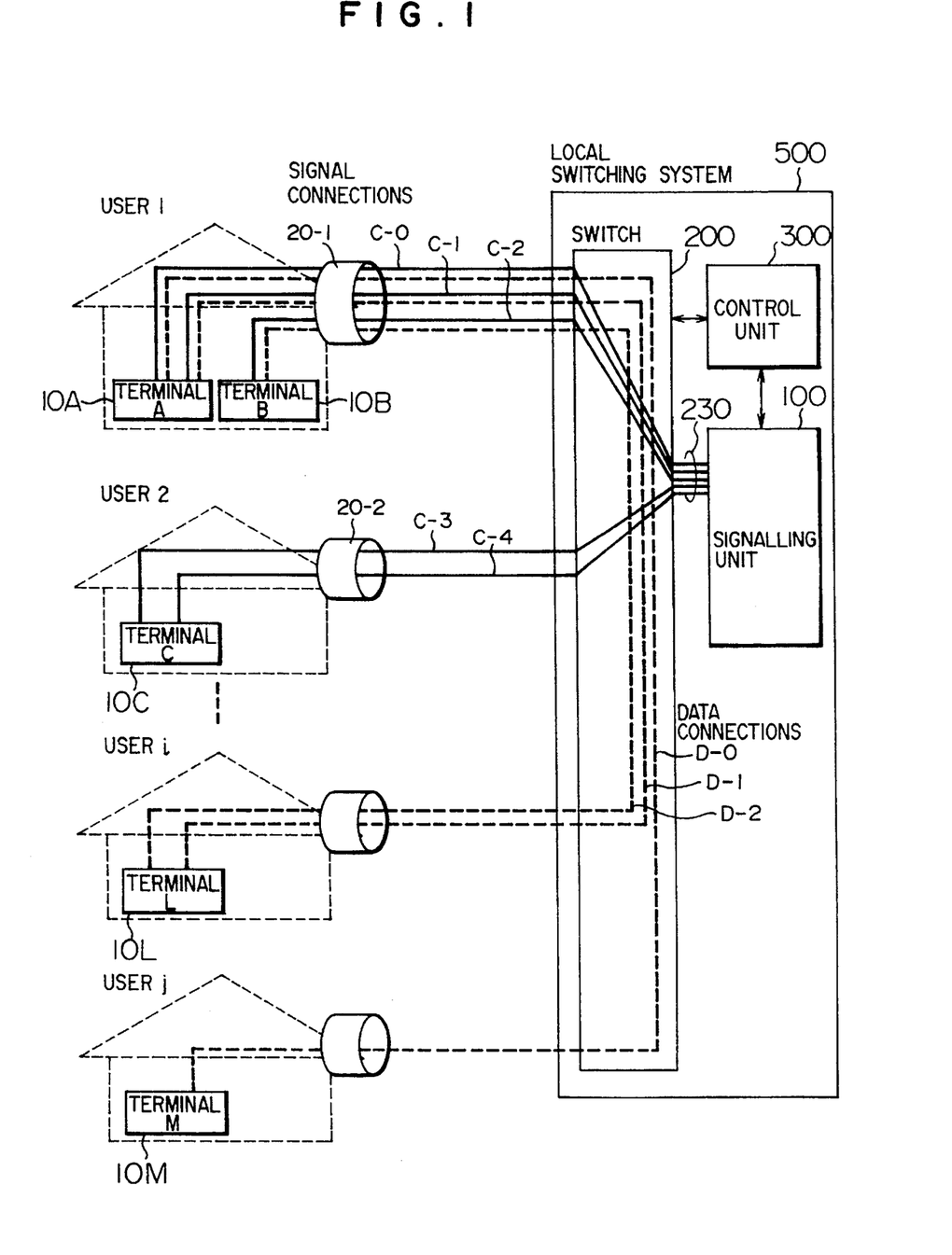
FIG. 1 is a diagram showing a general configuration of a local switching system as a typical example of the system to which the invention can be applied.

FIG. 1 shows a general configuration of a local switching system incorporating a signalling unit (100) to which the present invention is applied.

Referring to the figure, reference characters 10A to 10M denote user terminals (subscriber's terminals) which are connected to a local switching system (1000) via lines 20-i, respectively. In the case of the illustrated system, it is assumed that a line 20-1 is shared by two terminals 10A and 10B belonging to a user 1, wherein for the user terminal 10A, two signal connections C-0 and C-1 are set up for communication with a signalling unit 100 of the local switching system 500, while for the user terminal 10B, one signal connection C-2 is set up with the signalling unit 100. On the other hand, in the case of the user terminal 10C belonging to a user 2, there are set up two signal connections C-3 and C-4 on a line 20-2 for enabling communication with the signalling unit 100 of the local switching system 500.

The signal connections C-i mentioned above (where i=0, ..., 4) are provided separately from data connections D-i which are destined to be used for inter-terminal communication. Each of the user terminals 10 is adapted to execute at first a predetermined call setting procedure with the local switching system via the signal connection C-i and then allowed to communicate with a counterpart terminal via the data connection D-i.

The local switching system 500 can accommodate a plurality of lines 20-i connected to the user terminals 10, respectively, and is comprised of a switch 200 for switching the signal connections C-i and the data connections D-i, the signalling unit (100) for controlling reception/transmission of control signals with the individual terminals, and a control unit 300 for controlling call set-up (set-up of data connection) and disconnection. In this conjunction, it should be mentioned that the local switching system 500 is provided with an interface unit for each of the lines 20-i for performing header changing operation on input/output packets (or cells), although it is omitted from illustration in FIG. 1.

The signalling unit 100 is designed to execute communication protocols such as LAPD (Link Access Procedure on the D-channel), SSCOP (Service Specific Connection-Oriented Protocol) and others.

Figure 2:
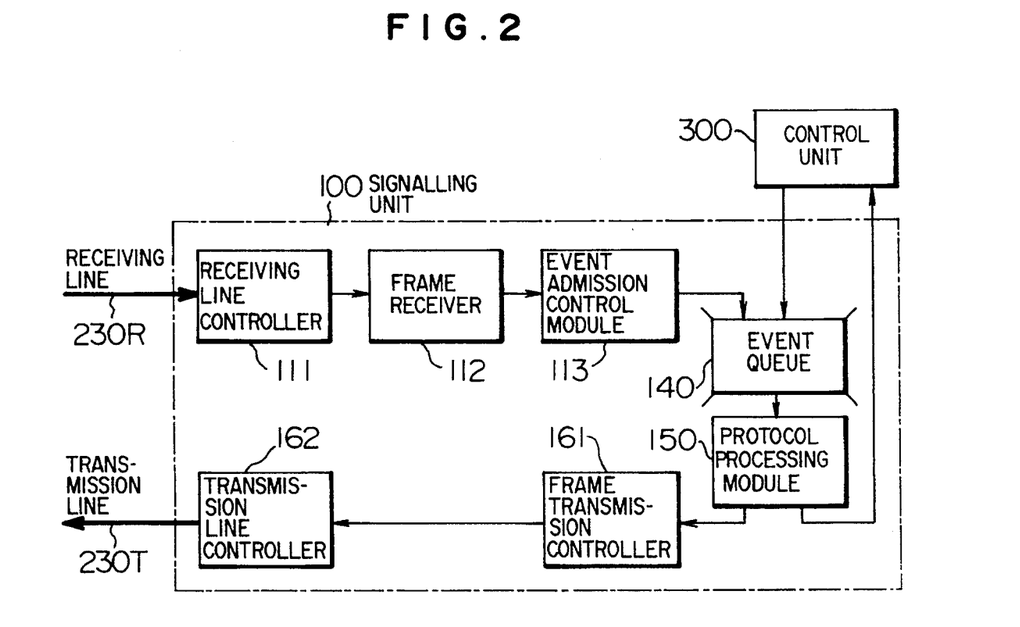
FIG. 2 is a block diagram for illustrating functions of a signalling unit 100 in the local switching system 500 shown in FIG. 1.

FIG. 2 is a block diagram for illustrating functions of the signalling unit 100.

In the figure, a reference numeral 111 denotes a receiving line controller which is connected to a receiving line 230R originating in the switch 200 and which performs processings such as frame separation, synchronization and the like for the control signals (received data) transmitted from the terminal equipment via the signal connection to thereby transfer the received data to a frame receiver 112, which then analyses the received data to thereby Generate an event indicating the reception of the frame. The event is transferred to an event admission control module 113. Upon reception of the event mentioned above, the event admission control module 113 checks the event as to whether or not the event as received can be registered in an event queue stored in a queue buffer 140 by referencing an event managing information table described hereinafter. In case the event can be registered in the event queue, it is then registered in the event queue at the trailing end thereof.

A reference numeral 150 denotes a protocol processing module which is designed to execute communication protocol processings on the events fetched sequentially from the event queue, starting from the leading one, and transfers the received data to a control unit 300. The protocol processing module 150 mentioned above generates a transmission frame when the protocol processing module is required to send a response frame to the terminal equipment. The frame as generated is then transferred to a frame transmission controller 161. In case the control information is to be transmitted to the individual terminal equipment from the control unit 300, a transmission command is registered in a command queue stored in the queue buffer 140 for allowing a transmission frame to be transferred to the frame transmission controller 161.

The frame transmission controller 161 transfers the transmission frame received from the protocol processing module to a transmission line controller 162, which in turn sends out the received transmission frame to the switch 200 via a transmission line 230T.

AT this juncture, it should be mentioned that when transmission/reception of the control signals with the terminal equipment is carried out in the form of packets (or cells of a fixed length), a receiving line controller 111 executes a processing for converting the received packets to a frame (also referred to as the assembling processing), while the transmission line controller 162 executes a processing for converting the frame to be transmitted into packets segmentation processing).

Figure 3:
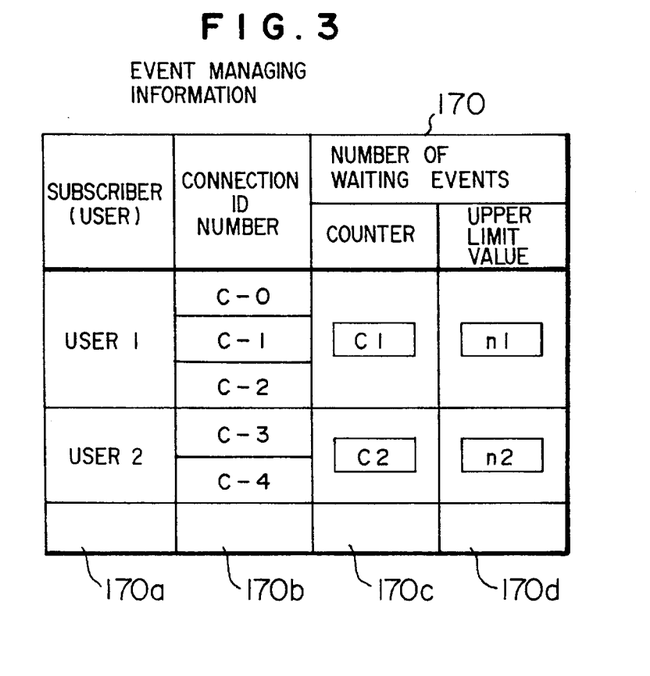
FIG. 3 is a view showing, by way of an example, an event managing information table which is used for event admission control in the afterementioned signalling unit 100.

FIG. 3 shows a structure of the event managing information table 170 which is referenced by the event admission control module 113.

The event managing information table 170 serves for managing connection identifier numbers 170b and the number of the events in correspondence to the subscribers (users) 170a, respectively. To this end, the event managing information table stores a count value 170c indicating the number of waiting events which stay currently in the event queue for each of the users and a permissible number (upper limit value) 170d of the waiting events predetermined for each of the users.

The event admission control module 113 makes reference to the event managing information table 170 mentioned above upon every reception of the event from the frame receiver module 112 to thereby check whether or not the event as received can be registered in the event queue 140. More specifically, the event admission control module 113 makes access to the event managing information table 170 by using as a key the connection identifier number of the event as received to thereby compare the waiting event count value 170c for the user to which the connection of concern belongs with the upper limit value 170d. Unless the count value mentioned above reaches the upper limit value, the event as received is registered in the event queue, whereupon the count value is incremented. By contrast, when the count value mentioned above reaches the upper limit value, a decision is made that the events received from the user of concern occurs too frequently, to thereby abandon the received event.

As is apparent from the foregoing, owing to the arrangement that registration of the reception event in the event queue 140 is controlled by the event admission control module 113 on a user-by-user basis, exclusive occupation of the reception processing capability of the signalling unit (100) by a particular user can positively be prevented. Parenthetically, the event admission control scheme mentioned above can be applied to the CCPs (Communication Control Processors) in general in addition to the signal processor of the switch.

Figure 4:
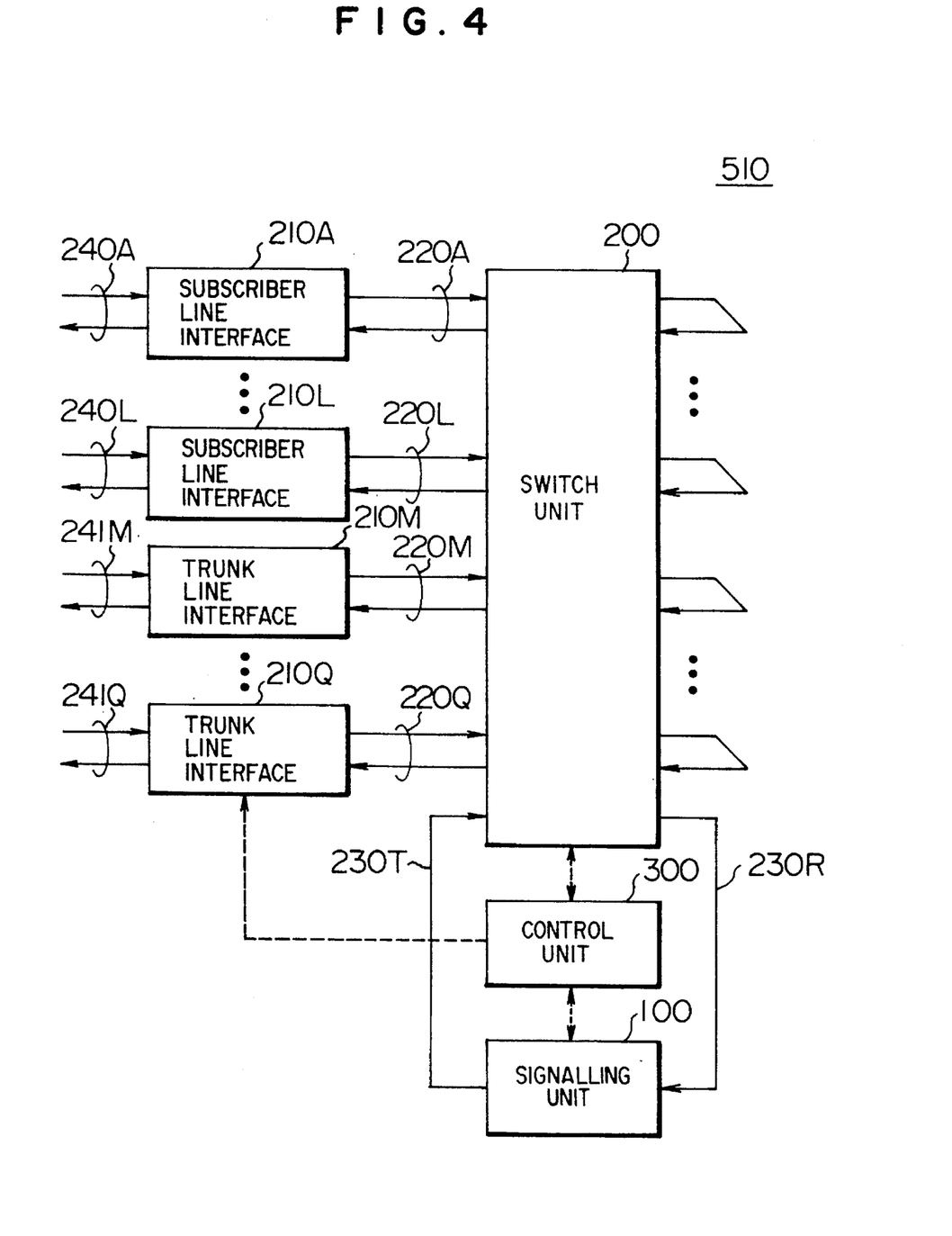
FIG. 4 is a view showing a structure of an ATM switch to which the present invention is applied.

FIG. 4 is a view showing generally a structure of an ATM (Asynchronous Transfer Mode) switch 500' equipped with a signalling unit 300 embodying the event admission control concept according to another embodiment of the invention. The ATM switch 500' serves to provide a virtual channel (VC) between subscriber's terminals for thereby realizing a multimedia communication, i.e., transaction of sound or speech, data, animated pictures and others.

The ATM switch 500' includes a switch unit 200, a signalling unit 100, a control unit 300, subscriber line interfaces 210A, ..., 210L provided for ATM subscriber lines 240 (240A, ..., 240L), respectively, and trunk line interfaces 210M, ..., 210Q provided for trunk lines 241 (241M, ..., 241Q), respectively, for interconnection with another switch.

Over the ATM subscriber lines 240, the trunk lines 241, input/output ports 220 (220A, ..., 220Q) of the switch and internal lines 230 (230R and 230T), communications are performed on a packet basis by making use of fixed-length packets each of 53 bytes which is referred to as the ATM cell.

The interfaces 210 are each provided with a capability of terminating physical layers of the ATM lines (subscriber lines or trunk lines) by resorting to cell synchronization or the like processing to thereby send out the ATM cells received from the external lines such as the ATM lines mentioned above to the input ports 220 of the ATM switch after having performed conversion of VPI/VCI (Virtual Path Identifier/Virtual Channel Identifier) included in a header field of each ATM cell, and a function for sending out the ATM cells received from the output ports of the ATM switch to external ATM lines after changing or conversion of the VPI/VCI value contained in the header field of each ATM cells as received. Parenthetically, the correspondence between the VIP/VCI values on the ATM lines and the internal VPI/VCI values which become valid internally of the ATM switch is supplied to the individual interfaces from the control unit 300 as information for the call set-up or connection.

The switch unit 200 serves for distributing the ATM cells inputted through the input ports to the output ports corresponding to the VPI/VCI values which are held in the header fields of the ATM cells, respectively. The ATM cell for the control purpose which includes call control information is transferred to the internal line 230R constituting one of the input/output ports to be thereby supplied to the signalling unit 100. On the other hand, the control-oriented ATM cell outputted from the signalling unit 100 is inputted to the switching unit 200 via the internal line 230T to be thereby transferred to another one of the output ports 220 which corresponds to the VPI/VCI value contained in the header field.

Figure 5:
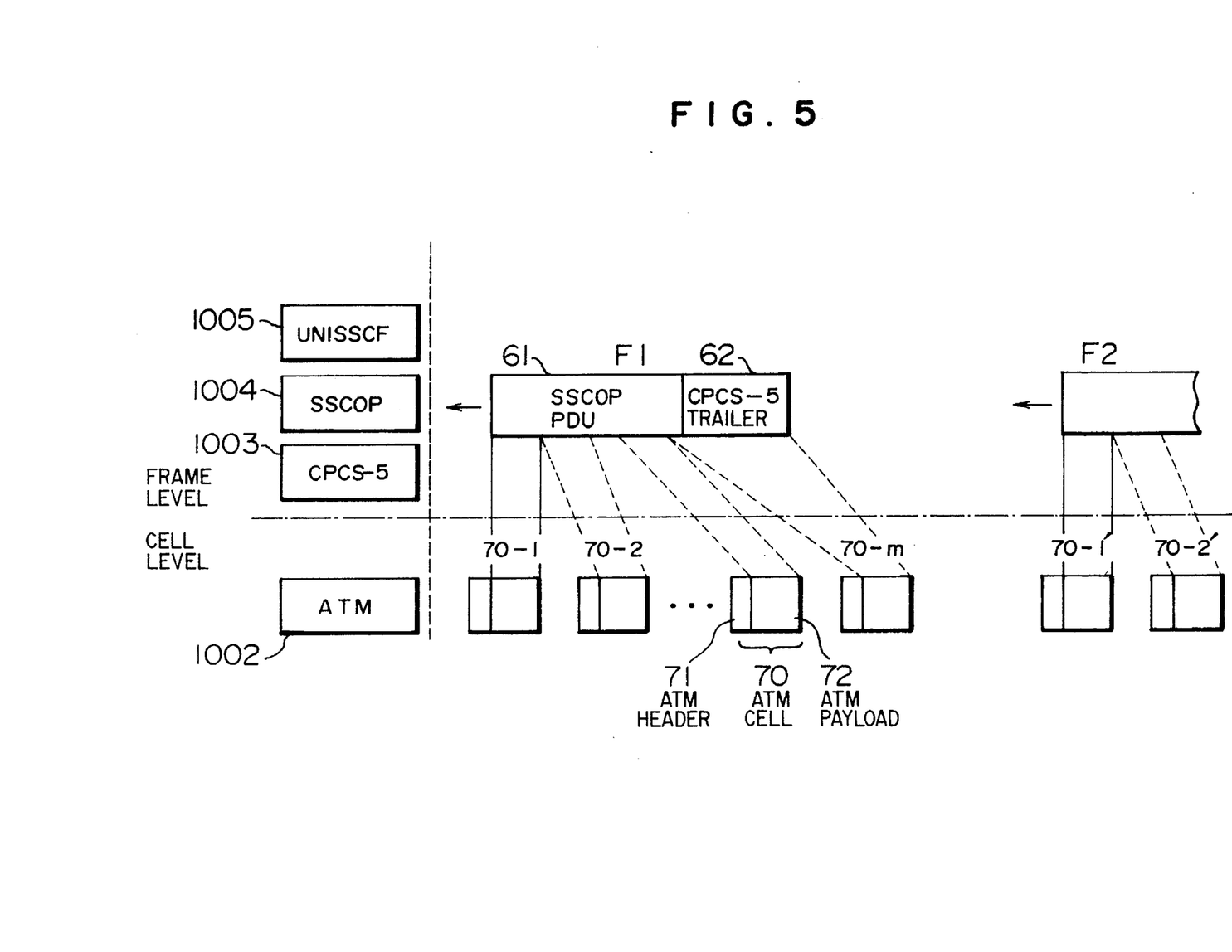
FIG. 5 is a view for illustrating relations between frames as transmitted and ATM cells.

FIG. 5 illustrates relations between the frames F (F1, F2, . . . ) handled by each terminal equipment 10 or the control unit 300 and the ATM cells 70 ( 70-1, 70-2, . . . ).

Each of the frames F is comprised of an information field 61 and a trailer field 62. Each frame F is divided into a plurality of data blocks each having a fixed length of 48 bytes, wherein each data block (information field) 72 having an ATM header 71 of 5 bytes representing the destination information constitutes the ATM cell 70. As the destination information, the VPI/VCI information of 20 or 24 bits is used. Incidentally, the information field 72 of the ATM cell is referred to as a "payload".

In the case of the example now under consideration, the contents of the protocol processings to be executed by the communication processor unit are shown in the form of protocol stacks 1002, . . . , 1005 on the assumption that the information field 61 of the frame F contains an error detecting code for a SSCOP-PDU (protocol data unit) with the trailer field 62 containing an error detecting code for CPCS-5 (Common Part Convergence Sublayer type 5). Description in detail of these protocol stacks will be made later on.

Figure 6:
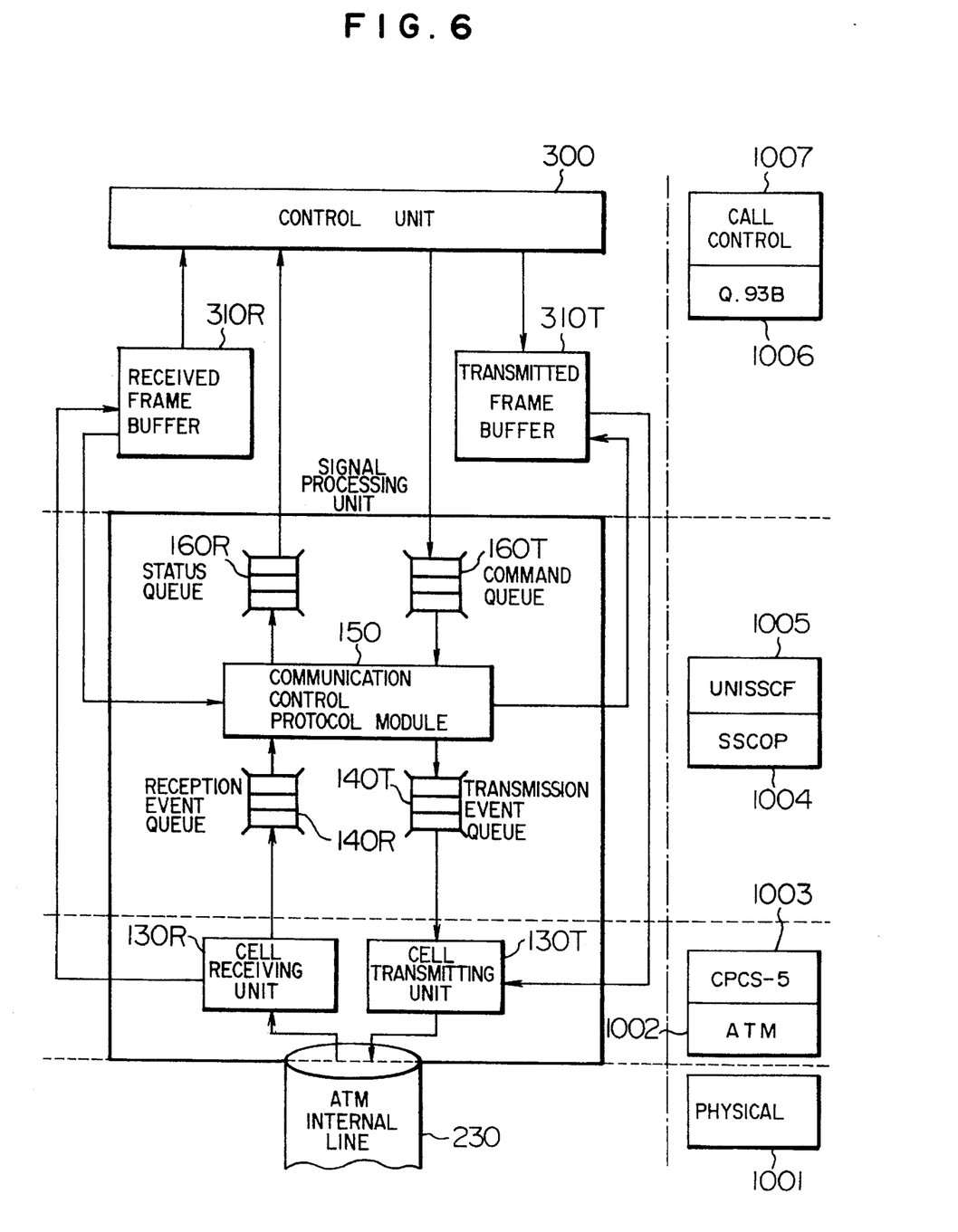
FIG. 6 is a view for illustrating functions of the signalling unit 100 shown in FIG. 4.

FIG. 6 illustrates relations between the signalling unit 100 and the control unit 300 on one hand and the protocol stacks 1001, . . . , 1007 for the signalling on the other hand.

Of the protocol stacks, a physical layer 1001 prescribes waveforms and others of the signals transmitted over the ATM line, while an ATM layer 1002 is capable of transforming the data frame F to the ATM cells and assembling the received ATM cells to the frame F. Further, a CPCS-5 (Common Part Convergence Sublayer type 5) layer 1003 serves for adding a bit error detecting code of 4 bytes to the trailer field of the frame to be transmitted and at the same time serves for detecting a transmission error by making use of a bit error detecting code contained in the received frame. In the case of the instant embodiment now under consideration, the cell receiving module 130R performs a reception of the functions of the CPCS-5 layer 1003 and the ATM layer 1002, while the functions relating to the transmission is executed by the cell transmitting module 130T.

The SSCOP layer 1004 is capable of resending an error frame, flow control of data for transmission/reception and other functions. Further, a UNI-SSCF (User Network Interface—Service Specific Coordination Function) layer 1005 serves for converting services provided by the SSCOP layer 1004 to those required by a Q.93B layer 1006 of hierarchically higher rank. According to the invention embodied in the illustrated embodiment, the functions of the UNI-SSCF layer 1005 and the SSCOP layer 1004 are executed by a communication control protocol module 150.

The Q.93B layer 1006 is a protocol standardized as a layer 3 of a wide-band ISDN (Integrated Services Digital Network) by the ITU-T (International Telecommunication Union—Telecommunication Standardization Sector). A call control (call processing) layer 1007 is hierarchically ranked higher than the above-mentioned Q.93B layer 1006 and is capable of functions such as controlling of the switch unit 200 on the basis of signal information. In the case of the instant embodiment of the invention, the functions of the aforementioned Q.93B layer 1006 such as, for example, call set-up/disconnection and the function of the call processing layer 1007 are realized by the control unit 300.

Referring to FIG. 6, upon reception of cells from the ATM internal line 230, the reception event queue 130R assembles the information fields of the cells having the same VPI/VCI into a received frame F on the basis of the information contained in the header fields of the individual cells. The cell receiving module 130R performs the protocol processing of the CPCS-5 layer 1003 on the received frame F upon completion of the assembling thereof and then stores the received frame F in a received frame buffer 310R while issuing a reception event which is then stored in a reception event queue 140R. At that time, the event admission control mentioned hereinbefore is performed.

The communication control protocol processing module 150 fetches sequentially the received events registered in the reception event queue 140R to execute the procedures prescribed by the SSCOP 1004 and the UNI-SSCF 1005, whereupon statuses indicating the results of the execution are registered in a status queue 160R. The control unit 300 executes the processing of Q.93B 1006 and the call processing 107 on the basis of the status read out from the status queue 160R.

On the other hand, an operation for transmitting the frame generated by the control unit 300 is performed in the manner described below.

At first, the control unit 300 places the frame to be transmitted in the transmitted frame buffer 310T and then registers a transmission command in the command queue 160T. The communication control protocol processing module 150 fetches sequentially the transmission commands from the command queue 160T to thereby execute the protocol procedures of the SSCOP 1004 and the UNI-SSCF 1005 for the frames to be transmitted in accordance with the relevant transmission commands, respectively. Thereafter, the transmission events are registered in the transmission event queue 140T. Subsequently, the cell transmission module 130T fetches the transmission events sequentially from the transmission event queue 140T mentioned above while reading out sequentially from the transmitted frame buffer 310T the frames for transmission which correspond to the transmission events, respectively, and executes the protocol processings of the CPCS-5 1003 on the frame. Thereafter, the frame to be transmitted is divided into a plurality of blocks which are then sent out onto the ATM internal line 230 as the ATM cells.

Figure 7:
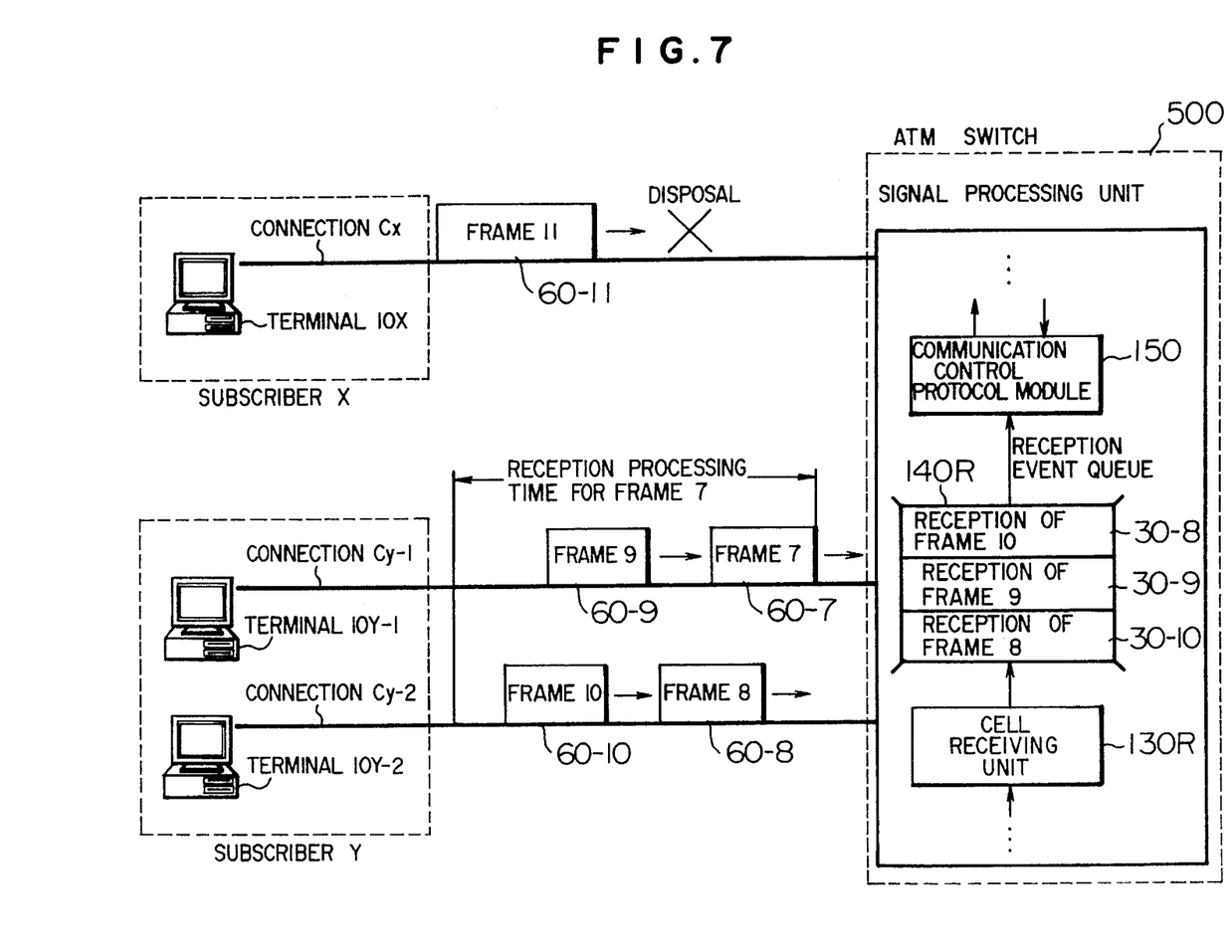
FIG. 7 is a view for illustrating necessity for reception event admission control in the signalling unit 100.

Now, referring to FIG. 7, the description will be directed to the problems which may take place in the reception processing upon occurrence of lots of reception events.

There exists a possibility that an excessively large number of transmitted frames reach the signalling unit 100 from the same user within a short time because of a system failure or other causes. By way of example, when the value of a polling timer, which is one of the parameters for initialization of the terminal is set abnormally small, the terminal equipment may issue very frequently the frames for the polling, which are sent to the signalling unit.

FIG. 7 illustrates a situation in the signalling unit 100 in which frames 60-7 to 60-10 are concentratively sent out from the terminals 10Y-1 and 10Y-2 of a user Y within a time T required for reception processing of one frame, which is immediately followed by the sending of a frame 60-11 from the terminal 10X of another user X. In actuality, on the ATM lines, the frames 60-i mentioned above are transmitted in the form of a plurality of ATM cells into which each frame is divided. However, for simplification of the illustration, it is assumed that transmission is performed on a frame-by-frame basis.

In the situation mentioned above, while the communication control protocol processing module 150 of the signalling unit 100 executes the reception processing for the frame 60-7, the cell receiving module 130R issues reception events 30-8, 30-9 and 30-10 sequentially for the succeeding frames 60-8, 60-9 and 60-10. In this conjunction, let's assume that the capacity (the length of queue) of the reception event queue 140R is "3" (although it is much longer in practice). In that case, at the time point when the reception event 30-10 is registered in the reception event queue 140R, the queue becomes full of events, as a result of which the reception event for the frame 60-11 received from the terminal of the user X in succession can no longer be registered in the reception event queue 140R but must be abandoned.

In other words, owing to the concentrative frame transmission from the terminal of the user Y, the reception processing capability of the signal processing unit 100 is exclusively occupied by the user Y, thus exerting adverse influence on the other users. This problem can be solved by setting previously an upper limit value on the number of the events which are allowed to be registered in the reception event queue for each of the users. By way of example, by setting the upper limit value of "2" on the reception event number for the user Y, the reception event 30-10 of the frame 60-10 is abandoned and instead thereof the reception event 30-11 for the frame 60-11 originating in the user X can be admitted for reception.

Figure 8:
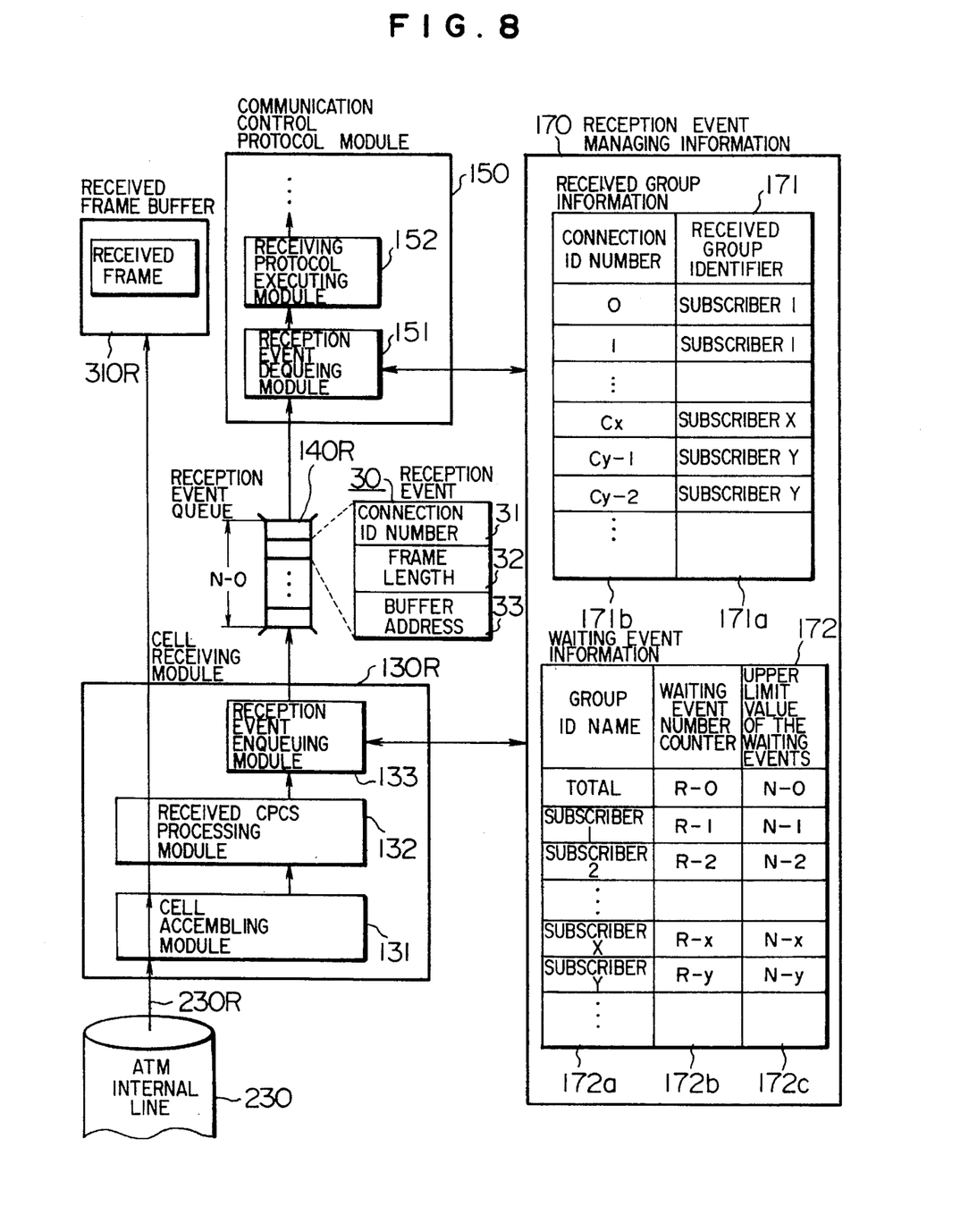
FIG. 8 is a diagram for illustrating the reception event admission control function in the signalling unit 100.

FIG. 8 is a block diagram for illustrating in detail the functions of the reception event queue 130R and the communication control protocol processing module 150 in the reception processings thereof.

The cell receiving module 130R includes a cell assembling module 131 for determining the connection identifier number from the VPI/VCI value contained in the received cells inputted via the ATM internal line 230R to thereby assemble the frame on the basis of the cell assembling information contained in the information fields, and a received frame CPCS processing module 132 which receives the assembled frame from the cell assembling module 131 to extract the CPCS-5 trailers (denoted by 62 in FIG. 5) such as the bit error detecting code and others from the frame as received for thereby executing the procedure of the CPCS-5 layer 1003 while storing the remaining frames in a received frame buffer 310R as the received frames F, and generates a reception event 30 composed of a connection ID number 31, a frame length 32 and a buffer address 33 for transferring the reception event 30 to a reception event enqueuing module 133.

The reception event enqueuing module 133 controls the number of reception events to be admitted on the user-by-user basis by referencing the reception event managing information table 170 which is comprised of a received group information table 171 and a waiting event information table 172. The received group information table 171 contains the correspondence between the connection ID numbers 171b and the received group identifiers (names of the users) 171a to which the connections belong, respectively. Thus, by referencing the received group information table 171, it is possible to identify the users in which the frames (connections) originate, respectively. The contents of the received group information table 171 mentioned above are furnished from the control unit 300 upon setting up of the connections.

The waiting event information table 172 contains records in correspondence to the received groups, respectively, and is composed of a waiting event number counter 172b indicating the number of received events waiting currently in the reception event queue 140 and the upper limit value of the waiting events 172c indicating the number of events which can be placed in the waiting queue for each of the received groups (users) 172a. Parenthetically, the waiting event information table 172 contains a record having the group identifier "total", in which a total event number and the upper limit value A (length of the received event queue) are stored for all the connections established to the signal processing unit 100.

The upper limit value 172c of the waiting events is initialized by the control unit 300 upon setting up of each connection. The control unit 300 sets up the upper limit value of the waiting events 172c at a greater value for the subscriber to whom large useable traffic is allocated while setting a smaller upper limit value of the waiting events 172c for the subscriber to whom the useable traffic is small, in accordance with the useable traffic applied for by the subscriber at the time of making the contract concerning the use of the line. The waiting event number counter 172b is incremented by the reception event enqueuing module 133 upon every event registration to the reception event queue 140R, while it is decremented by the communication control protocol processing module 150 upon dequeuing of the reception event queue.

The reception event enqueuing module 133 makes a decision on the basis of the number of the waiting events for all the groups contained in the waiting event information table 172 as to whether the reception event queue 140R is full or not. Unless it is full of waiting events, the reception event enqueuing module 133 references the received group information table 171 to search the record having the same group identifier 172a as the received group identifier and to compare the content of the waiting event number counter 172b with the upper limit value of the waiting events 172c. When the waiting event number counter 172b has attained the upper limit value of the waiting events 172c, the relevant received event 30 is abandoned. Unless the content of the waiting event number counter 172b reaches the upper limit value 172 of the waiting events, the reception event 30 is enqueued in the reception event queue 140R with the value of the corresponding waiting event number 172b being incremented by one.

The communication control protocol processing module 150 includes a reception event dequeuing module 151 for reading out sequentially the reception events 30 from the reception event queue 140R and a receiving protocol executing module 152 for executing the protocol processing for the reception event 30 as dequeued. Upon extraction of the reception event 30 from the reception event queue 140R, the reception event dequeuing module 151 references the received Group information table 171 for determining the received Group identifier 171a which corresponds to the connection ID number 31 of the reception event 30 of concern to thereby decrement by one the waiting event number counter corresponding to the above-mentioned received Group identifier contained in the waiting event information table 172.

In the foregoing description, it has been assumed that connections belonging to the same user constitute one group, and the number of the admitted reception events is controlled on a group-by-group basis. It should however be noted that the connection group for which the reception event admission control is performed may be based on another type of unit than the user basis such as, for example, a terminal-by-terminal basis.

Figure 9:
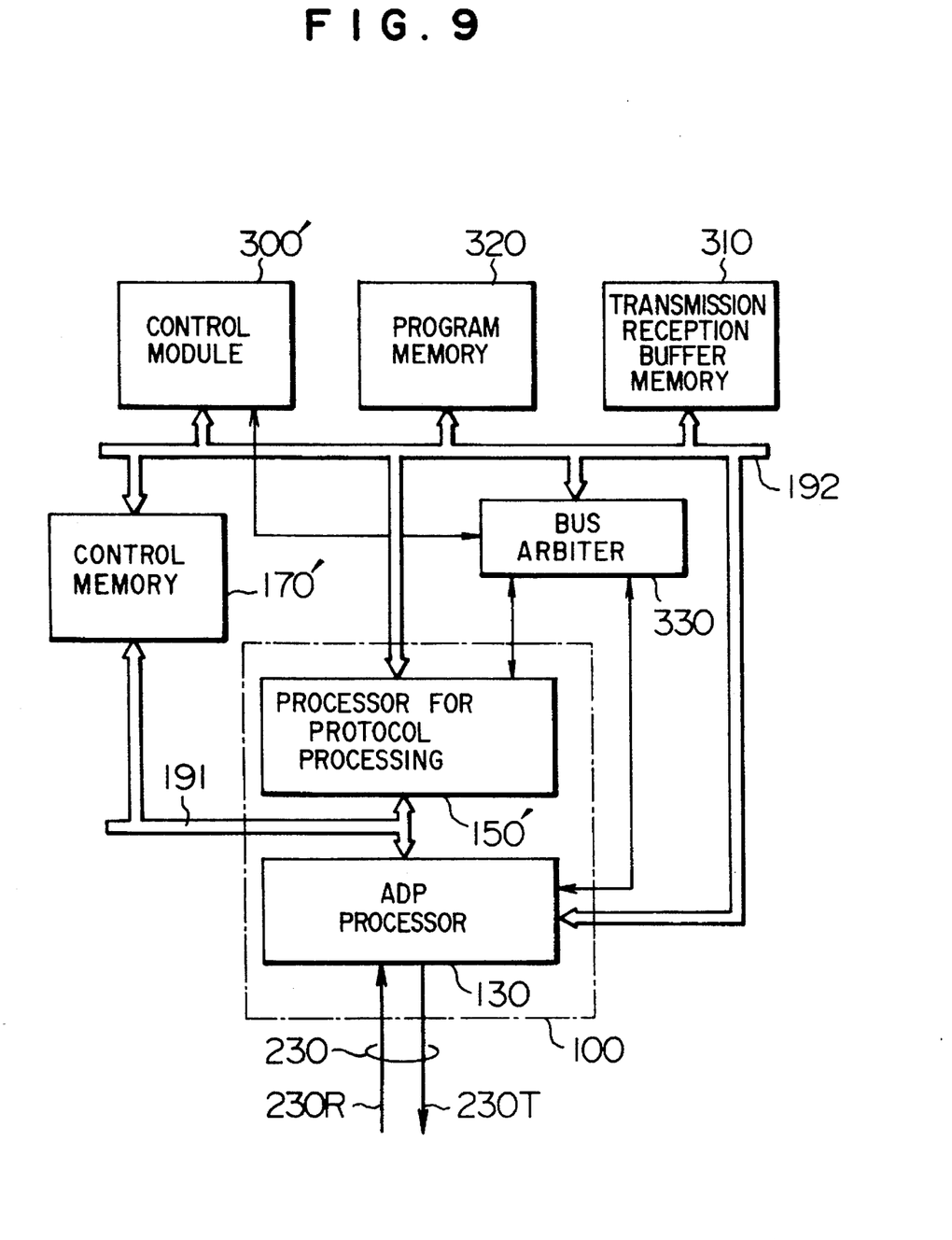
FIG. 9 is a block diagram showing a concrete circuit configurations of the signalling unit 100 and a control unit 300 shown in FIG. 6.

FIG. 9 shows a configuration of a circuit including the signalling unit 100 serving for the reception event admission control function and the control unit 300.

Referring to the figure, the signalling unit 100 includes an ADP (adaptation) processor 130 serving for the functions of the reception event queue 130R and the transmission event queue 130T shown in FIG. 6 and a protocol processor 150' serving for the function of the communication control protocol processing module 150. These two processors are connected via an internal bus 191 to a control memory 170' which constitutes the reception event managing information table 170 shown in FIG. 2 and additionally is connected to a buffer memory 310 which constitutes the received frame buffer 310R and the transmitted frame buffer 310T shown in FIG. 6.

Connected to the internal bus 192 are a processor 300' constituting the control unit 300, a memory 320 for storing control programs to be executed by the processor mentioned above and a bus arbiter 330, wherein the accesses of the processors 300, 130 and 150' to the buffer memory 310 are controlled by the bus arbiter 330. The reception event queue 130R, the transmission event queue 130T, the status queue 160R and the command queue 160T can be realized by making use of parts of the control memory 170' or the buffer memory 310.

As is apparent from the foregoing description, it is possible to prevent the event queue from being occupied exclusively by any particular user terminal due to an abnormal transmitting or sending operation thereof to thereby suppress adverse influences an the communications of other users by virtue of such function provided according to the invention that in the signalling apparatus (communication control apparatus), registration of the reception events in the event queue is limited for the connection for which the predetermined conditions are met.

What we claim is:

1. A control method for a communication control apparatus connected between a transmission path and a processing unit for executing a predetermined protocol processing on transmitted/received frames, each having a connection identifier, comprising the steps of:

managing a number of received frames which are waiting for protocol processing in said communication control apparatus in correspondence with respective connection identifiers;

responding to reception of a new frame from said transmission path to thereby make a decision as to whether or not the number of received frames, having a connection identifier corresponding to that of said received new frame and waiting for protocol processing, has attained a predetermined threshold value; and abandoning said received new frame if the number of said received frames waiting for said protocol processing has reached said predetermined threshold value;

said connection identifiers being classified into groups, while a threshold value is stored in correspondence to each of said groups, wherein upon reception of a new frame from said transmission path, said new frame is abandoned when the number of received frames, waiting for the protocol processing and corresponding to the group to which the connection identifier of said received new frame belongs, has attained the corresponding threshold value.

2. A communication control method as claimed in claim 1, comprising the steps of:

receiving from said transmission path a plurality of packets; and assembling said packets received from said transmission path into said new frame, wherein a decision as to whether said new frame is to be abandoned is made after said assembling.

3. A communication control method as claimed in claim 1, wherein after storing said received new frame in a frame buffer memory, said decision as to whether or not said received new frame is to be abandoned is made;

wherein unless the number of received frames waiting for said protocol processing has attained the predetermined threshold value, a reception event having information specifying said received new frame is stored in an event queue; and wherein, after executing a predetermined protocol processing on a received frame corresponding to a reception event read out in an orderly manner from said event queue, the information included in said received frame is transferred to said processing unit.

4. A communication control apparatus connected between a transmission path and a processing unit, comprising:

memory means for storing a number of received frames, which are in a state of waiting for protocol processing in said communication control apparatus, in correspondence with connection identifiers;

first means responsive to reception of a new frame from said transmission path for referencing said memory means to determine whether or not the number of the received frames, corresponding to the connection identifier of said received new frame and waiting for said protocol processing, has reached a threshold value and for abandoning said received new frame if said number has reached said threshold value and, if otherwise, placing said received new frame in the state of waiting for the protocol processing; and second means for executing a predetermined protocol processing on one of the received frames in the state of waiting for protocol processing;

wherein said connection identifiers are classified into groups and a threshold value for the number of frames waiting for the protocol processing is stored in said memory means on a group-by-group basis; and wherein upon reception of a new frame from said transmission path, said first means reads out from said memory means the number of the received frames waiting for the protocol processing and corresponding to the group to which the connection identifier of said newly received frame belongs and the threshold value to thereby decided whether or not said newly received frame is to be abandoned.

5. A communication control apparatus connected between a transmission path and a data processing unit, comprising:

a first processor for assembling a plurality of packets received from said transmission path into a received new frame while dividing a frame to be transmitted into a plurality of packets to be send out onto said transmission path;

a second processor for performing protocol processings on the received new frame assembled by said first processor and a frame to be transmitted as received from said data processing unit; and a memory for storing the number of the received frames which are in a state of waiting for protocol processing by said second processor, in correspondence with connection identifiers;

wherein said first processor includes means responsive to every assembling of a received new frame for referencing said memory to decide whether or not the number of the frames, waiting for protocol processing and corresponding to the connection identifier of said received new frame; has reached a threshold value for thereby abandoning said received new frame if said number reaches said threshold value, while placing said received new frame in the state of waiting for protocol processing by said second processor, unless said number reaches said threshold value;

wherein said connection identifiers are classified into groups and said memory stores threshold values indicating permissible numbers of the frames waiting for the protocol processing for said groups, respectively; and wherein upon every assembling of a received new frame, said first processor reads out from said memory the number of the frames waiting for protocol processing and corresponding to the group to which the connection identifier of said received new frame belongs and said threshold value to thereby decide whether or not said received new frame is to be abandoned or not.

6. A communication control apparatus as claimed in claim 5, a buffer memory for storing received frames and an event queue memory for storing a predetermined number of events;

wherein said first processor loads a received new frame into said buffer memory, and unless the number of frames waiting for protocol processing and corresponding to the connection identifier of said received new frame reaches said threshold value, said first processor registers in said event queue memory a reception event having information specifying said received new frame;

wherein said second processor performs predetermined protocol processing on the received new frame which is stored in said buffer memory and which corresponds to a reception event read out from said event queue memory.

7. A communication control apparatus as claimed in claim 5, wherein said first processor includes means for selectively counting up the number of the frames waiting for protocol processing in said memory on the basis of the connection identifier of said received frame; and wherein said second processor includes means for selectively counting down the number of the frames waiting for protocol processing in said memory on the basis of the connection identifier of the received new frame which has undergone said protocol processing.

8. A communication control apparatus as claimed in claim 6, wherein said first processor includes means for selectively counting up the number of the frames waiting for protocol processing in said memory on the basis of the connection identifier of said received frame; and wherein said second processor includes means for selectively counting down the number of the frames waiting for protocol processing in said memory on the basis of the connection identifier of the received new frame which has undergone said protocol processing.

9. A switching system, comprising:

a switch having a plurality of input ports and a plurality of output ports for outputting packets received from each of said input ports selectively to one of said output ports which is determined in accordance with header information of said packets;

a signalling unit connected to said switch for assembling said packets received from said switch into received frames and for performing a predetermined protocol processing on the received frames; and a control unit connected to said signal processing means;

wherein said signalling unit includes:

memory means for storing the number of received frames which are in a state of waiting for protocol processing in correspondence with connection identifiers;

first means responsive to reception of a new signalling frame from said switch for making a decision by referencing said memory means as to whether or not the number of the received frames, corresponding to the connection identifier of said received new signalling frame and waiting for said protocol processing, has reached a threshold value for thereby abandoning said received signalling frame when said number has reached the threshold value and, if otherwise, placing said received signalling frame in the state of waiting for protocol processing; and second means for executing a predetermined protocol processing one of on the frames in the state of waiting for protocol processing;

wherein said connection identifiers are classified into groups, said memory means stores threshold values indicating permissible numbers of the frames allowed to wait for protocol processing in correspondence with said groups, respectively; and wherein upon reception of a new signalling frame from said transmission path, said first means reads out from said memory means the number of the frames waiting for protocol processing and corresponding to the connection identifier of said received new signalling frame and said threshold value to thereby decide whether or not said new received signalling frame is to be abandoned or not.

10. A communication control apparatus receiving from a line a plurality of frames having connection identifiers differing from one another and executing a communication protocol on each of the received frames, comprising:

means for classifying a plurality of connections into groups and storing a count value indicating an amount of resource being used and a threshold value indicating an useable amount of resource for each of said groups; and means responsive to reception of a new frame from said line for referencing said storing means to thereby compare the count value indicating the amount of resource being used and the threshold value in correspondence with the connection identifier of said received new frame for thereby refusing allocation of the resource for said received new frame in case said count value has reached said threshold value, while, if otherwise, allocating said resource to allow protocol processing to be performed on said received new frame.

* * * * *